Feb. 28, 1928.

A. E. FALKENBURY

CIGAR ASH RETAINER

Filed Nov. 23, 1927

1,661,035

WITNESSES
Edw. Thorpe
F. J. Foster

INVENTOR
Arthur E. Falkenbury
BY
Munn & Co.
ATTORNEY

Patented Feb. 28, 1928.

1,661,035

UNITED STATES PATENT OFFICE.

ARTHUR E. FALKENBURY, OF WHITEHALL, NEW YORK.

CIGAR-ASH RETAINER.

Application filed November 23, 1927. Serial No. 235,278.

The present invention is concerned with the provision of a unique device intended primarily for retaining the ash of a cigar while the latter is being smoked, and eliminating the fire hazard incidental to smoking and carrying lighted cigars.

The device is in the nature of a reticulated, preferably metallic mesh, cylindrical ash retaining cage open at one end so that it may be readily slipped over a cigar.

Preferably this cage is of sufficient size to permit a cigar to be conveniently entered therein and readily adjustable to snugly grip the cigar.

Various forms of wire mesh or equivalent material may be used as will be more fully explained hereafter. The material of the cage is such that it will retain the ashes as a cigar is smoked, and at the same time will permit the convenient relighting of a partially smoked cigar without removing it from the cage.

Further objects of the invention are to provide an ash retainer of this character of extremely simple, practical construction which will be rugged durable and efficient in use, light in weight and well suited to the requirements of economical mannufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
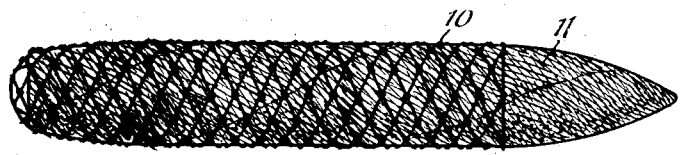
Fig. 1 is a side elevational view showing a fresh cigar fitted into an ash retaining cage constructed in accordance with the present invention.
Figure 2:
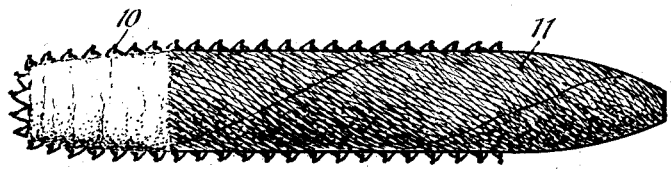
Fig. 2 is a similar view except that the cage is shown in section and the cigar illustrated as partially consumed.
Figure 3:
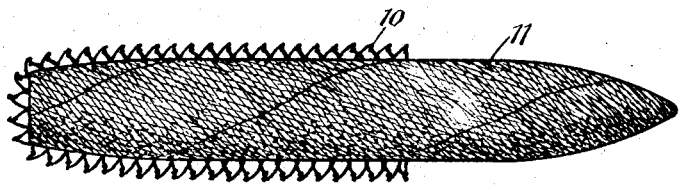
Fig. 3 is a view similar to Fig. 2 showing the formation of the cage when the cigar is entered therein and before the cage is longitudinally extended and circumferentially contracted.

Referring first to Figs. 1, 2 and 3 of the drawings I have shown a cylindrical cage 10 open at one end for the insertion of the cigar 11. This cage is preferably formed of annealed or soft-drawn fine gage wire of suitable mesh to retain the cigar ashes. The cage-forming wires are diagonally crossed as best seen in Fig. 1, and soldered at every intersection. This cage is inherently non-resilient, but is readily circumferentially contractible and longitudinally extensible due to the fact that the wire itself is readily bendable.

The cage is normally of somewhat larger internal diameter than the cigar to be accommodated therein, as best seen in Fig. 3. In this figure the cigar has been inserted into the cage. By the simple expedient of drawing the fingers along the cage, the cage may be longitudinally extended and circumferentially contracted so that it will assume the position of Fig. 1, snugly fitting the cigar. In Fig. 2 I have illustrated the manner in which the ashes are retained, and it will of course be apparent that the reticulated formation of the ash retainer permits ready relighting of a cigar without removing it from the cage.

Figure 4:
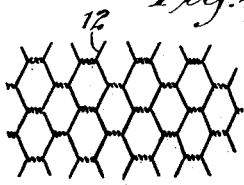
Fig. 4 is an enlarged fragmentary plan view illustrating a modification of wire mesh which might be used in forming the cage.

In Fig. 4 I have shown a modified type of mesh 12 which may be formed of spring wire or annealed wire. The wire strands are twisted together approximately in the manner in which the ordinary "chicken wire mesh" is twisted. With this form of the invention the inherent resiliency of the spring wire tends to retain the cage in a position in which it will snugly fit the cigar. To insert a cigar therein, the two ends of the cage are advanced towards each other, circumferentially expanding the cage to permit the insertion of the cigar, after which the cage automatically springs back into snug gripping engagement with the cigar.

With the "chicken wire" formation where annealed wire is used, the cage is made larger in diameter than the cigar with which it is to be used. By drawing the fingers along the cage the cage becomes circumferentially smaller and snugly fits the cigar. Thus, the form of the invention shown in Fig. 4, if made of annealed wire will function substantially in the same manner as the forms indicated in Figures 1 to 3 inclusive.

It will be apparent that structures other than the wire mesh might be employed, and in fact, numerous changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. An ash retainer for cigars comprising an open mesh elongated cylindrical cage open at one end to permit the insertion of a cigar therein and circumferentially contractible to grip the cigar, the mesh of the cage being such that circumferential contraction of the cage is caused by longitudinal extension thereof.

2. An ash retainer for cigars comprising an open mesh elongated cylindrical cage open at one end to permit the insertion of a cigar therein and circumferentially contractible to grip the cigar, the mesh of the cage being such that circumferential contraction of the cage is caused by longitudinal extension thereof, the cage being readily manually deformable to effect such longitudinal extension or contraction.

Signed at Whitehall, in the county of Washington and State of New York, this 18th day of November, A. D. 1927.

ARTHUR E. FALKENBURY.